United States Patent [19]

Beard et al.

[11] Patent Number: 4,950,406
[45] Date of Patent: Aug. 21, 1990

[54] FLOW ADJUSTING VANE FOR INTRA-CHANNEL CLARIFIER

[75] Inventors: Harold J. Beard; Raleigh L. Cox; Gary J. Beard; Mark B. Beard; Michael D. Todd, all of Baton Rouge, La.

[73] Assignee: United Industries, Inc., Baton Rouge, La.

[21] Appl. No.: 322,071

[22] Filed: Mar. 10, 1989

Related U.S. Application Data

[63] Continuation-in-part of Ser. No. 262,496, Oct. 25, 1988, which is a continuation of Ser. No. 3,943, Jan. 16, 1987, Pat. No. 4,780,206.

[30] Foreign Application Priority Data

Jun. 13, 1986 [EP] European Pat. Off. ........ 86304559.7

[51] Int. Cl.$^5$ .............................................. B01D 21/28
[52] U.S. Cl. .................................. 210/521; 210/320; 210/926
[58] Field of Search ............... 210/926, 629, 626, 320, 210/628, 521, 522

[56] References Cited

U.S. PATENT DOCUMENTS

| 3,903,000 | 9/1975 | Miura et al. | 210/522 |
|---|---|---|---|
| 4,285,818 | 8/1981 | Muskat | 210/926 |
| 4,303,516 | 12/1981 | Stensel et al. | 210/926 |
| 4,324,655 | 4/1982 | Muskat | 210/926 |
| 4,362,625 | 12/1982 | Beard | 210/926 |
| 4,383,922 | 5/1983 | Beard | 210/926 |
| 4,446,018 | 5/1984 | Cerwick | 210/926 |
| 4,457,844 | 7/1984 | Beard | 210/626 |
| 4,626,353 | 12/1986 | Beard et al. | 210/523 |
| 4,634,526 | 1/1987 | Salkeld et al. | 210/521 |
| 4,634,528 | 1/1987 | Beard et al. | 210/277 |
| 4,780,206 | 10/1988 | Beard et al. | 210/522 |
| 4,798,673 | 1/1989 | Huntington | 210/926 |
| 4,816,157 | 3/1989 | Jennelle | 210/532.2 |
| 4,839,050 | 6/1989 | Beard et al. | 210/926 |

FOREIGN PATENT DOCUMENTS

| 8301500 | 11/1984 | Netherlands | 210/926 |
|---|---|---|---|
| 1369752 | 1/1980 | U.S.S.R. | 210/522 |

Primary Examiner—Richard V. Fisher
Assistant Examiner—Cynthia L. Nessler
Attorney, Agent, or Firm—William David Kiesel; Robert C. Tucker; Timothy J. Monahan

[57] ABSTRACT

Operation of an intra-channel clarifier within a circulating sewage stream can be enhanced by flow adjusting vanes positioned within the sewage stream between the clarifier and channel wall, proximate to the clarifier sludge ports. In a preferred embodiment, the vanes are aligned perpendicular to the flow of the stream, on a vertical axis. The vanes are divided into an independently adjustable upper and lower portion which can be used to direct the sewage flow and alter the cross sectional area of the sewage stream in the vicinity of the clarifier. The rate at which sludge is removed from the clarifier is affected by the velocity of the sewage stream beneath the sludge ports as well as any turbulence or eddy currents which are produced.

16 Claims, 5 Drawing Sheets

FLOW ADJUSTING VANE FOR INTRA-CHANNEL CLARIFIER

RELATED APPLICATIONS

This application is a continuation in part of pending application Ser. No. 07/262,496 filed Oct. 25, 1988, which is a continuation of Ser. No. 003,943 filed Jan. 16, 1987 and now U..S. Pat. No. 4,780,206 issued Oct. 25, 1988 which claims priority to European Patent Office Application No. 86304559.7 filed Jun. 13, 1986.

BACKGROUND OF THE INVENTION

1. Field of the Invention.

This invention relates generally to intra-channel clarifiers and, more particularly, to devices which control the fluid dynamics of sewage stream circulating around the clarifier.

2. Prior Art.

In oxidation ditch sewage treatment systems, intra-channel clarifiers are often employed. Examples of intrachannel clarifiers may be seen in Harold J. Beard's U.S. Pat. Nos. 4,362,625; 4,383,922; and 4,457,844. Such clarifiers function by utilizing the hydraulic head losses created by a moving stream of sewage as it passes around and/or under a stationary semi-submerged structure.

The channel itself may be a round or oval tank, usually with a central partition forming a continuous channel in which to circulate a sewage stream. In the conventional system, the waste water is constantly flowed in the ditch while at the same time aerated to provide oxygen for microorganisms decomposing the sewage. A clarifier having side walls, a bottom and a number of sludge removal ports in the bottom can be positioned in the sewage stream within the channel. Pressure differences between the interior and the exterior of the clarifier cause the circulating sewage to be drawn within the clarifier where reduced velocities promote separation of sediment and sludge from the waste water. Sludge is withdrawn from the bottom of the clarifier through a series of sludge removal ports of some type and the clarified liquid is then removed from the interior of the clarifier. The velocity of the waste stream flowing beneath the bottom of the clarifier creates a pressure differential and draws sludge out of the clarifier and back into the stream where it is digested further.

One of the methods of controlling the head differential created by the waste water stream flowing beneath the clarifier has been to raise or lower the clarifier within the channel. By varying the displacement of the clarifier, the velocity of the waste stream past the sludge removal ports can be varied thereby varying the rate of sludge removal from the clarifier. However, the sheer bulk of the clarifier makes this method of adjustment awkward. An improved method of adjusting the fluid dynamics of the waste water stream flowing past the clarifier is desired.

SUMMARY OF THE INVENTION

Therefore, it is an object of this invention to provide a method for controlling the fluid dynamics of a waste water stream flowing past an intra-channel clarifier.

Another object of this invention is to provide a flow adjusting apparatus which is less expensive to implement.

Another object of this invention is to provide a flow adjusting apparatus which can be fine-tuned to vary not only the cross-section of the stream but the location of the constriction.

Other objects and advantages of this invention shall become apparent from the ensuing description of the invention.

Accordingly, a flow adjuster for use in a sewage stream channel having an intra-channel clarifier therein, the clarifier having side walls, a bottom and a plurality of sludge ports in the bottom, is provided comprising a vane positioned within the stream between a wall of the channel and the clarifier, proximate to the sludge ports. The vane has an axis supported against a flow of the stream. The vane may be pivoted on the axis to adjust the area of the vane presented against the flow thereby varying the cross section of the stream and the velocity of the flow past the clarifier.

PREFERRED EMBODIMENT OF THE INVENTION

Without limiting the scope of this invention, the preferred features and embodiments of this invention are hereinafter described.

Figure 1:
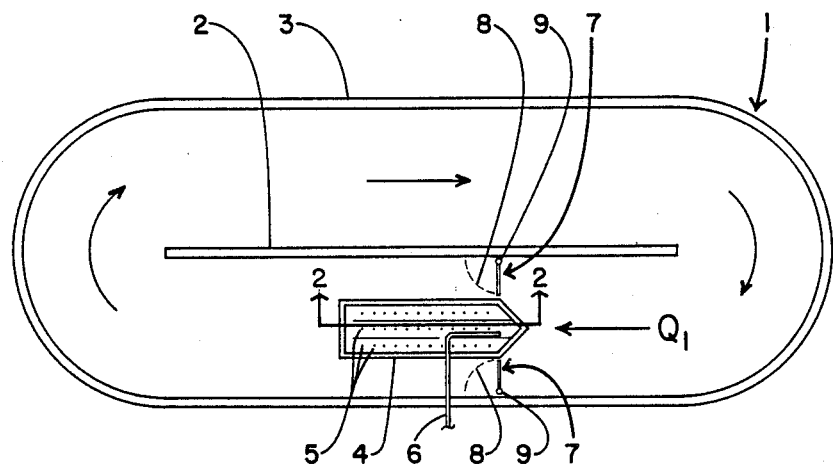
FIG. 1 is a top view of an intra-channel clarifier installed in an oxidation ditch.

Referring to FIG. 1 a typical oxidation ditch is shown. The oxidation ditch comprises channel 1 having interior partition 2. Rotors or other water moving devices (not shown) generate a flow of sewage Q1 in channel 1. Typically, aeration devices (not shown) are employed to disperse oxygen within a stream and accelerate aerobic digestion of the sewage. Clarifier 4 is positioned in the flow of stream Q1 approximately midway between partition 2 and outer wall 3 of channel 1. A portion of stream Q1, shown as Q2, enters the rear of clarifier 4 where its velocity is reduced and phase separation is promoted. The sludge is withdrawn from the bottom of clarifier 4 through sludge ports 5. The clarified stream is withdrawn from the front of the clarifier via conduit 6.

Vanes 7 are positioned between clarifier 4 and the side walls of channel 1. Vanes 7 may be pivoted through arc 8 to vary the cross section of stream Q1 thereby altering its velocity.

In one embodiment, a pair of vanes 7 are positioned immediately upstream from sludge ports 5 on either side of clarifier 4. Vanes 7 need not be upstream from all of sludge ports 5. For example, in some applications it may be desirable to decrease the suction induced on some of sludge ports 5 by placing vanes 7 downstream from those sludge ports. The flow impinging on vane 7 creates a positive pressure on the upstream side of vane 7 which is realized by the upstream sludge ports. It can be seen then that because a vane may be used to either increase or decrease suction, vanes 7 may be placed across from or proximate to sludge ports 5 on the upstream or downstream side.

The scope of this invention is intended to include applications where the clarifier is positioned against one of the walls that define channel 1. The wall of the channel to which the clarifier is attached may be curved or straight. For example, a clarifier may be attached to the outer wall of a circular sewage treatment plant which has a center post instead of an interior partition. To the extent that the position of the vane is described in terms of its location between the clarifier and a wall of the channel, the center post of a circular clarifier is intended to be included within the scope of a "wall".

The example used in the description herein is that of an intra-channel clarifier having a rear opening for incoming sewage. Other models of intra-channel clarifiers provide openings for incoming sewage in the front, side and bottoms. To the extent that a clarifier has openings in the bottom for removal of sludge, the invention herein is applicable, and is intended to include such clarifiers with its scope.

Figure 2:
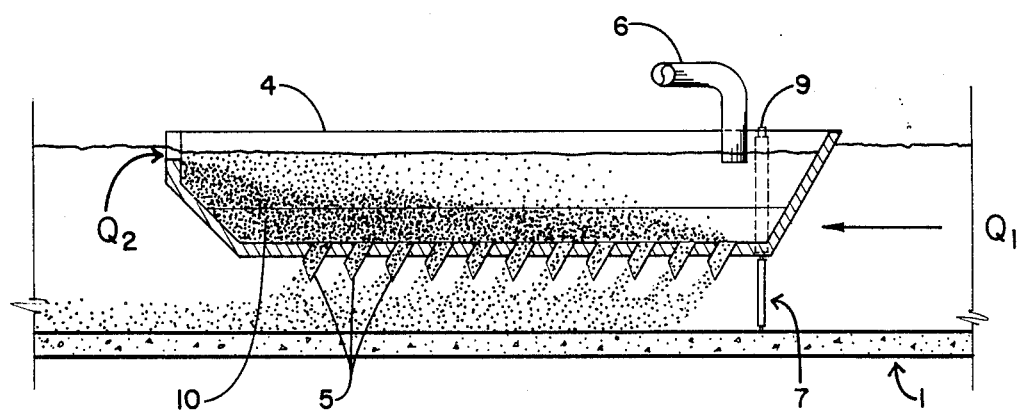
FIG. 2 is a sectional view along line 2—2 of FIG. 1.

FIG. 2 is sectional view taken along line 2—2 in FIG. 1. A portion of the sewage stream, Q2, enters the rear of clarifier 4. Due to the decreased velocity within clarifier 4, sludge 10 settles where it is eventually removed through sludge ports 5. The supernatant migrates towards the bow of clarifier 4 and is drawn out conduit 6. The displacement caused by clarifier 4 reduces the cross section of Q1. The velocity of Q1 beneath clarifier 4 creates a pressure differential drawing sludge 10 back into channel 1 for further aerobic digestion. An improved method to direct the flow of Q1 around clarifier 4 and adjust Q1's velocity is the subject of this application. The adjustments permit fine tuning of phase separation within clarifier 4.

Figure 9:
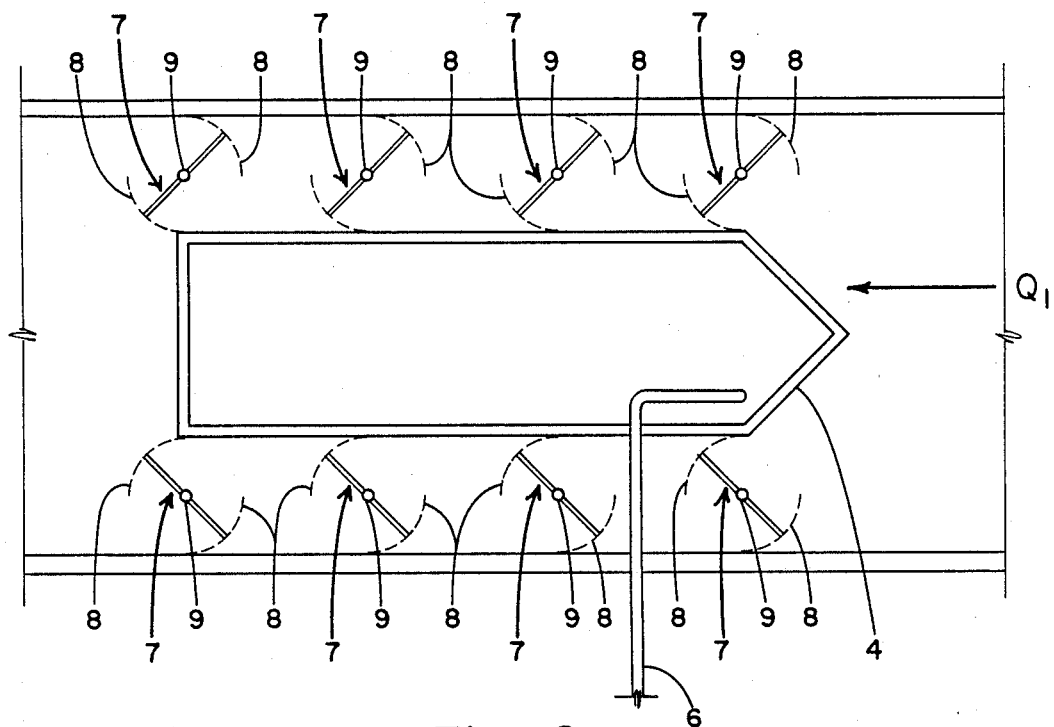
FIG. 9 is a top view of an alternate embodiment of the invention employing a series of individually adjustable vanes on either side of the clarifier.

FIG. 9 is an example of an alternate embodiment of the invention in which a plurality of vanes 7 are positioned on either side of clarifier 4, downstream from one another. Each vane has an upstream side and a downstream side. The force of stream Q1 impinging on a vane causes a back pressure upstream of each vane 7 which in turn increases the positive pressure on any sludge ports 5 which are upstream of a particular vane 7. Conversely, sludge ports 5 which are downstream from a particular vane 7 will experience increased suction. It is possible to modulate the suction or pressure differential on the sludge ports 5 throughout the length of clarifier 4 by adjusting the positive and negative pressure induced by each of a series of vanes 7. In the vanes shown in FIG. 9, axis 9 transects vane 7 to help balance the torque exerted by the force of stream Q1.

Figure 3:
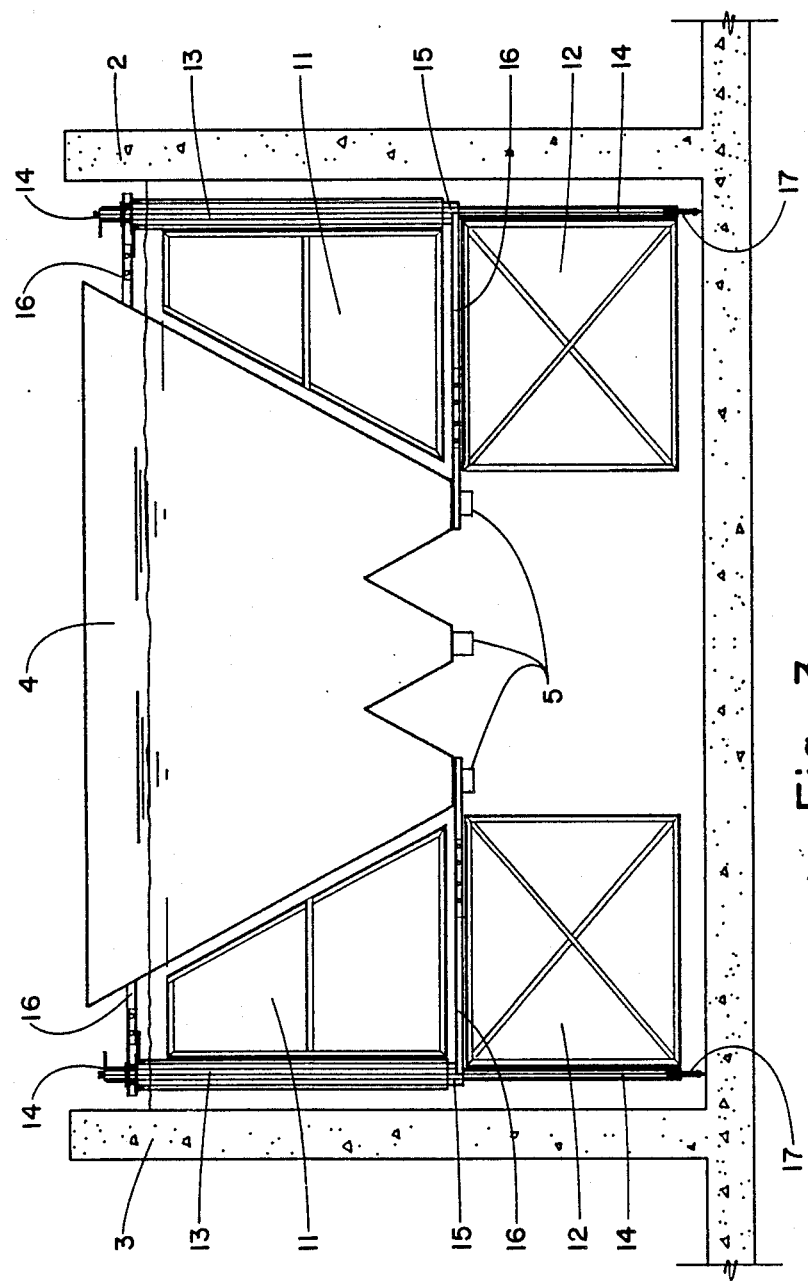
FIG. 3 is a frontal view of the clarifier and flow adjusting vanes.

FIG. 3 is a frontal view of clarifier 4 and the flow adjusting apparatus. What has generally been designated as vanes 7 will be hereinafter described in greater detail. Each set of vanes 7 is comprised of first and second independently adjustable vanes designated vanes 11 and 12 respectively. Upper vanes 11 pivot on an axis defined by pipe 13. Similarly, lower vane 12 pivots on an axis defined by second pipe 14 which is coaxial to first pipe 13. Both first pipe 13 and second pipe 14 are supported against the flow of stream Q by third pipe 15 which is coaxial to and positioned between first pipe 13 and second pipe 14. Third pipe 15 is in turn connected by braces 16 to the channel wall, or, as shown in FIG. 3, to clarifier 4.

The relative lengths and positions of pipes 13, 14 and 15 are important to allow independent adjustment of upper vanes 11 and lower vanes 12. As shown in FIG. 3, first pipe 13 extends from the top edge of upper vane 11 to the lower edge of vane 11. Third pipe 15 is inside first pipe 13 and extends out either end to a distance sufficient to allow braces 16 to be attached. It is important that the lower end of third pipe 15 not interfere with pivoting of lower vane 12. Second pipe 14 is interior to third pipe 15 and extends from the bottom edge of vane 12 to a height greater than brace 16. Adjustable leg 17 is threaded into the bottom of second pipe 14 to further brace vanes 7. The vane adjusting mechanism is not shown in either FIGS. 3 or 4 and will be discussed in detail below.

Figure 4:
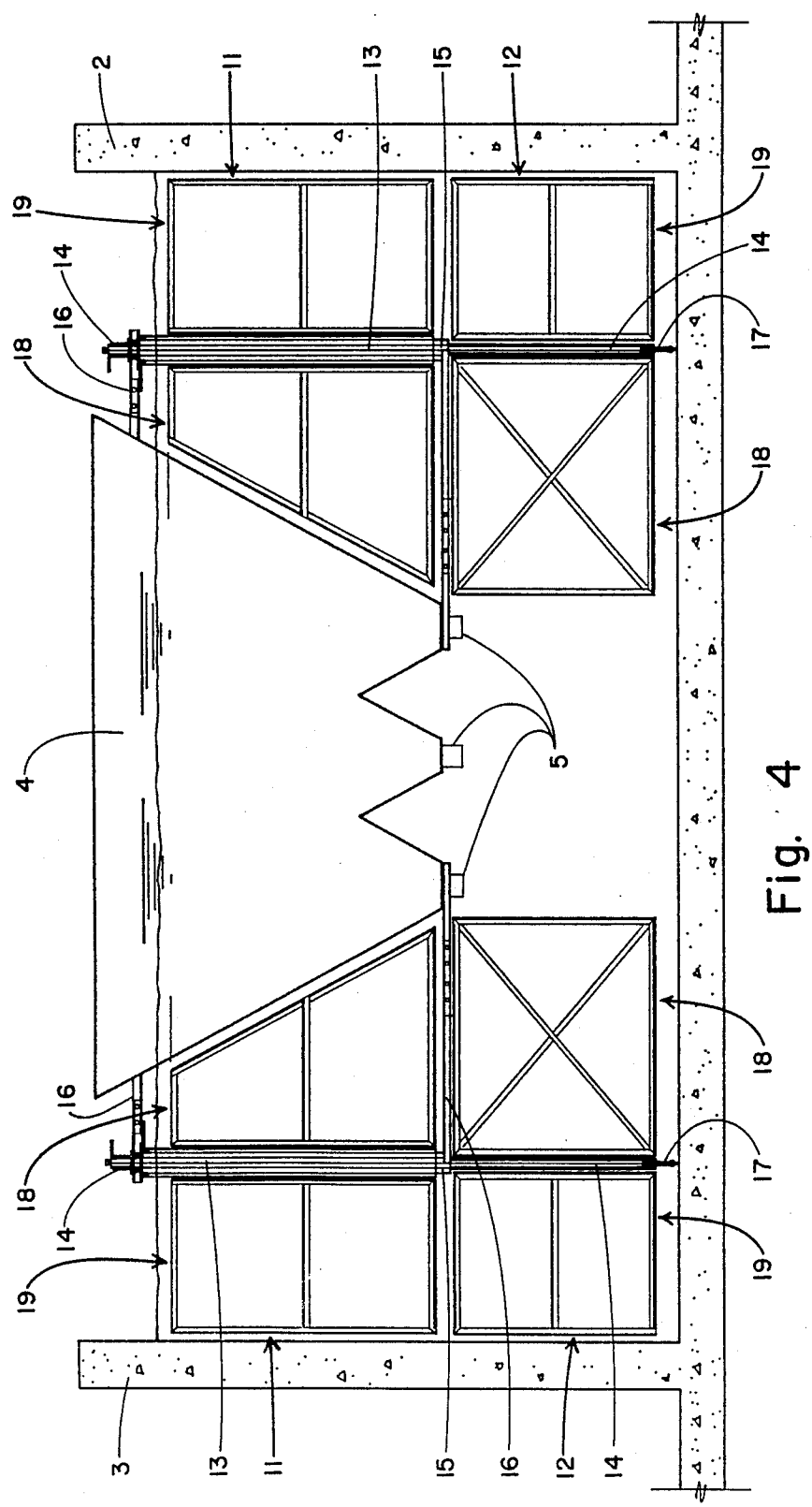
FIG. 4 is a frontal view of the clarifier showing an alternate embodiment of the flow adjusting vane.

The distance between the channel wall 3 and clarifier 4 can vary from system to system. As the width of vane 7 increases, the force of flowing stream Q1 produces a greater moment thereby increasing the torque on axis 9. FIG. 4 shows a method to reduce the torque on axis 9 by positioning axis 9 to transect vane 7. Each of upper vanes 11 and lower vane 12 are divided into inside portions 18 and outside portions 19 relative to clarifier 4. In a preferred embodiment, inside portions 18 and outside portions 19 have substantially equal surface area. However, to the extent that axis 9 transects vane 7, the torque on axis 9 will be decreased. As in the embodiment shown in FIG. 3, the vane shown in FIG. 4 may be braced against clarifier 4, channel walls 2 and 3 or against both.

Figure 6:
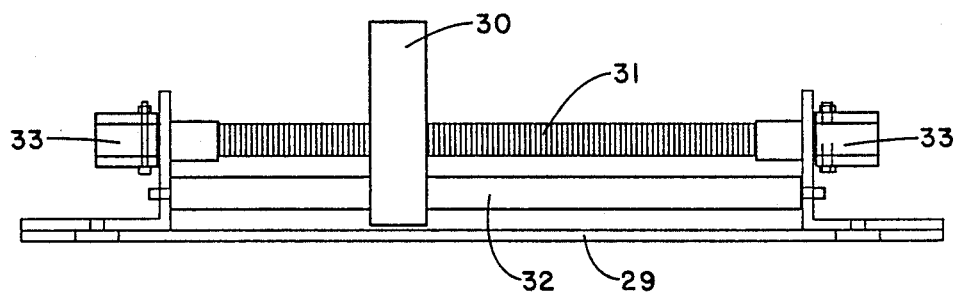
FIG. 6 is a rear view of the vane adjusting mechanism.
Figure 7:
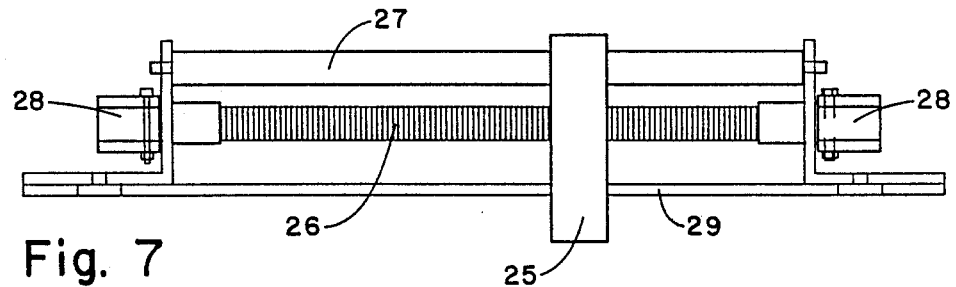
FIG. 7 is an front view of the vane adjusting mechanism.
Figure 8:
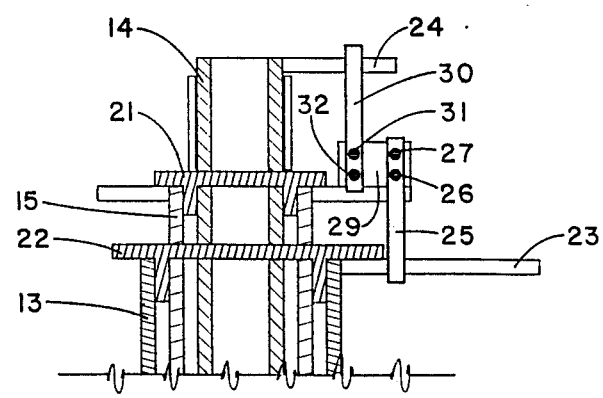
FIG. 8 is a sectional view of the vane adjusting mechanism installed on the pipes which pivot to adjust the vanes.

The vane adjusting mechanism is shown in detail in FIGS. 5 through 8. In FIG. 8, vane adjuster 20 is shown fixedly mounted on third pipe 15 which is held stationary by brace 16. Bushings 21 and 22 align second pipe 14 and third pipe 15, and third pipe 15 and first pipe 13, respectively.

A forked arm 23 extends perpendicularly from first pipe 13. Similarly, forked arm 24 extends perpendicularly from second pipe 14. First pipe 13 is pivoted by the action of lower pin 25 which engages the tines of forked arm 23. Pin 25 travels tangential to first pipe 13 on threaded rod 26 and guide rod 27. Guide rod 26 has adjusting nut 28 for manual adjustment. Threaded rod 26 and guide rod 27 are supported by bracket 29.

Likewise, second pipe 14 is independently adjustable by upper pin 30 engaging the tines of forked arm 24. Pin 30 travels on threaded rod 31 and guide rod 32 which are supported by bracket 29. Pin 30 may be repositioned on threaded rod 31 by turning adjusting nut 33.

Figure 5:
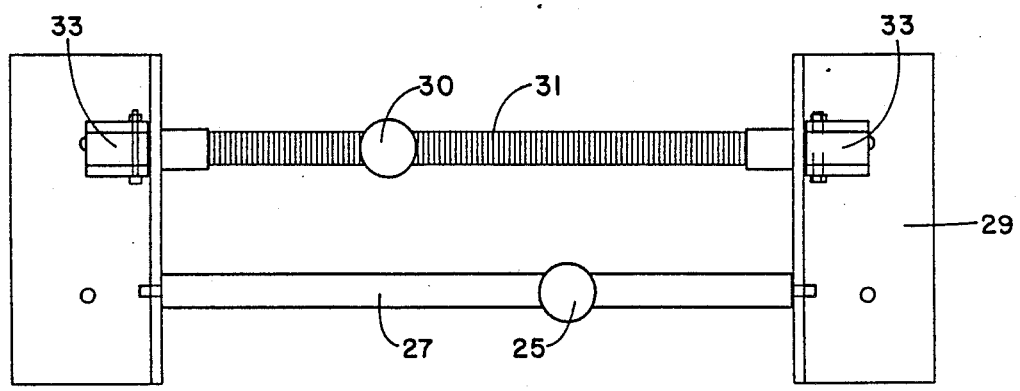
FIG. 5 is a top view of the vane adjusting mechanism.

A top view, rear view and front view of vane adjuster 20 is shown in FIGS. 5, 6 and 7 respectively.

The foregoing description of the preferred embodiment of the invention is not intended to suggest that one particular configuration of vane 7 will be suitable for all applications. For example, flow rate Q1, the composition of the sewage stream and configuration of the channel may vary from one installation to another. Those with skill in the art will be able to adjust the cross sectional area of the sewage stream to control the pressure differential created at the sludge ports. The system disclosed in the preferred embodiment herein permits adjustment not only of the cross sectional area but also the location of where that adjustment will be made. Those with skill in the art can adjust the upper and lower vanes to achieve the desired velocity of stream Q1 while minimizing undesirable turbulence and eddy currents induced by the reduction of cross sectional area of the stream. As used herein, the vanes are located "proximate" to the sludge ports when the vanes are across from the sludge ports or near enough to have an appreciable effect on the pressure differential created at the sludge ports by the flow of the sewage stream.

Those with skill in the art will realize that the area of vane 7 presented against the flow of stream Q1 may be adjusted by means other than pivoting. For example, vane 7 may be folded, slid or collapsed within a guide rail to vary the area presented to the flow.

There are, of course, many obvious alternate embodiments and modifications to this invention which are intended to be included within the scope of the following claims.

What I claim is:

1. In an intrachannel clarifier for clarifying a sewage stream within a channel, said clarifier comprising sidewalls, a bottom and a sludge removal port in said bottom, the improvement comprising a flow adjuster, said flow adjuster comprising:
   (a) a first vane positioned in said stream between a wall of said channel and said clarifier, across from and upstream of said sludge removal port, said vane further having an upper edge, a lower edge and a vertical axis perpendicular to a flow of said stream defined by a first pipe having a top end and a bottom end;
   (b) means to support said first vane against a flow of said stream;
   (c) means to pivot said first vane on said axis to adjust an area of said vane presented against said flow of said stream;
   (d) a second vane positioned in said stream between a wall of said channel and said clarifier, across from and upstream of said sludge removal port, at a depth below said first vane, and said bottom end of said first pipe, said second vane further having an upper edge, a lower edge and a vertical axis perpendicular to said flow of said stream defined by a second pipe coaxial to said first pipe, said second pipe extending upward through said first pipe;
   (e) means to support said second vane against said flow of said stream; and
   (f) means to pivot said second vane on said axis to adjust an area of said second vane presented against said flow of said stream.

2. A flow adjuster as in claim 1 wherein said support means for said first vane and said second vane comprises a stationary third pipe coaxial to and positioned between said first pipe and said second pipe, said third pipe having a top end at a height between said top end of said first pipe and a top end of said second pipe, and said third pipe further having a bottom end at a depth between said upper edge of said second vane and said bottom end of said first pipe.

3. A flow adjuster as in claim 1 wherein said means to adjust said first vane and said second vane comprises a first arm extending perpendicularly from said top end of said first pipe, a second arc extending perpendicularly from said top end of said second pipe, a first threaded rod positioned above and parallel to an arc defined by movement of said first arm, a downwardly extending first pin threadable on said first rod and engaging said first arm, a second threaded rod positioned below and parallel to an arc defined by movement of said second arm, a second pin engaging said second arm, and a bracket supporting said first and second threaded rods in a fixed position relative to said axis defined by first and second pipes.

4. In combination with a sewage treatment system having a sewage stream flowing within a channel and an intra-channel clarifier positioned in the sewage stream, said intra-channel clarifier having sidewalls and a bottom defining an interior and an exterior, an inlet and at least one sludge removal port opening into said sewage stream, the improvement comprising an apparatus for adjusting a velocity of said sewage stream flowing past said sludge removal port, said apparatus comprising a vane positioned in said stream between a wall of said channel and said exterior of said clarifier across from and upstream of said sludge removal port, means to support said vane against a flow of said stream and means to adjust an area of an upstream side of said vane presented against said stream.

5. A combination according to claim 4 wherein said sludge removal port is located in said bottom of said clarifier and is directed downward and said stream flows beneath said bottom of said clarifier.

6. A combination according to claim 5 wherein said vane does not extend underneath said bottom of said clarifier.

7. A combination according to claim 5 wherein said vane is confined to a location in said stream defined by said wall of said clarifier, an exterior of a sidewall of said clarifier closest to said wall and an imaginary plane extending downward from a junction of said sidewall and said bottom of said clarifier.

8. A combination according to claim 5 wherein said vane has an axis upon which said vane pivots, and further said vane is positioned a sufficient distance from said sludge removal port to avoid blocking said opening in sludge removal when said vane is pivoted.

9. A combination according to claim 4 wherein said vane supporting and adjusting means comprises an axis upon which said vane pivots.

10. A combination according to claim 9 wherein said axis transects said upstream side of said vane such that said area of said upstream side on one side of said axis is substantially equal to said area of said upstream side on an opposite side of said axis.

11. A combination according to claim 9 wherein said vane is positioned a sufficient distance from said sludge removal port to avoid blocking said opening in said sludge removal port when said vane pivots.

12. A combination according to claim 9 wherein said axis is perpendicular to a flow of said stream.

13. A combination according to claim 12 wherein said axis is vertical.

14. A combination according to claim 9 further comprising a second vane positioned in said stream between said wall of said channel and said exterior of said clarifier, across from and downstream of said sludge removal port, means to support said second vane against a flow of said stream and means to adjust an area of an upstream side of said second vane presented against said stream.

15. A combination according to claim 14 wherein second vane supporting and adjusting means comprises a second axis upon which said second vane pivots.

16. A combination according to claim 15 wherein said second axis transects said upstream side of said second vane such that said area of said upstream side on one side of said second axis is substantially equal to said area of said upstream side on an opposite side of said second axis.

* * * * *